United States Patent [19]

Heytmeijer

[11] 4,382,069

[45] May 3, 1983

[54] MULTIPLE BATCH RECOVERY OF ACID DISSOLVED MOLYBDENUM

[75] Inventor: Herman R. Heytmeijer, Whippany, N.J.

[73] Assignee: Westinghouse Electric Corp., Pittsburgh, Pa.

[21] Appl. No.: 407,678

[22] Filed: Aug. 12, 1982

[51] Int. Cl.$^3$ ............................................. C01G 39/00
[52] U.S. Cl. ...................................... 423/56; 423/58; 423/593; 23/301
[58] Field of Search ................. 423/55, 56, 58, 61, 423/593; 23/301

[56] References Cited

U.S. PATENT DOCUMENTS

| | | |
|---|---|---|
| 1,250,063 | 12/1917 | Westling et al. ...................... 423/56 |
| 1,948,407 | 2/1934 | Watts ..................................... 423/55 |
| 3,393,971 | 7/1968 | Vanderpool et al. ................. 423/55 |
| 3,963,823 | 6/1976 | Kulkarni ............................... 423/56 |
| 4,307,065 | 12/1981 | Heytmeijer ........................... 423/56 |

Primary Examiner—Herbert T. Carter
Attorney, Agent, or Firm—W. D. Palmer

[57] ABSTRACT

Rapid recovery of molybdenum from an acid solution containing dissolved molybdenum is accomplished by using a multiple batch method. A first batch of ammonium molybdate precipitate is formed by diluting a first portion of acid with 1.5 times that volume of water, adding anhydrous ammonia, and seeding with ammonium molybdate particles while maintaining a temperature between 90° C. and boiling. Subsequent batches of precipitate are formed by dissolving the previous precipitate in additional acid, similarly diluting as above, and adding anhydrous ammonia while maintaining temperature as above. All precipitates are coarse and fast settling.

5 Claims, No Drawings

MULTIPLE BATCH RECOVERY OF ACID DISSOLVED MOLYBDENUM

BACKGROUND OF THE INVENTION

This invention relates to the rapid and efficient recovery of dissolved molybdenum from a solution of mixed sulfuric acid-nitric acid.

The processing of tungsten wire into filament coils, especially double-coiled filaments, requires the use of molybdenum mandrels around which the coil is wrapped. After the tungsten wire is thus formed and cut to size and hydrogen baked to permanently set the coil turns, the entire member is immersed in a warm solution of mixed sulfuric acid and nitric acid which dissolves the retained molybdenum mandrel leaving the formed tungsten coil intact. The resulting coil of tungsten is then in a form suitable for use, such as a filament for an electric lamp.

The relative concentrations of the mixed sulfuric acid and nitric acid are subject to some variation and a mixed acid solution of sulfuric acid (normality of thirteen) and nitric acid (normality of seven) has been found to be suitable. When this acid solution has sufficient molybdenum dissolved therein so that the molybdenum is present in an amount of from about 40 grams to about 75 grams per liter of acid solution, the rate of molybdenum dissolution becomes sufficiently slow that the acid is regarded as spent.

In U.S. Pat. No. 3,963,823, dated June 15, 1976, is disclosed a method for recovering the molybdenum from the spent acid. In accordance with the teachings of this patent, ammonium hydroxide is added to a diluted spent acid solution to partially neutralize same and raise the pH thereof to a value of from about 1.5 to about 3. The solution is then maintained in a heated condition for a predetermined time sufficient to precipitate therefrom substantially all of the dissolved molybdenum as ammonium molybdate which is then recovered for further use. More specifically, after initial partial neutralization, the solution temperature preferably is maintained at from 70° C. to 80° C., with constant solution agitation for a period of at least about ten hours and preferably from ten hours to twenty hours in order to precipitate the dissolved molybdenum as ammonium molybdate complex.

In U.S. Pat. No. 4,307,065 dated Dec. 22, 1981, there is provided a method for quickly recovering molybdenum in a form substantially free from other metals from a mixed sulfuric acid-nitric acid aqueous solution which has substantial quantities of molybdenum dissolved therein and which has been used to dissolve molybdenum mandrels from coiled tungsten filaments. In accordance with this improved method, the spent mixed acid solution is diluted with water to a predetermined acid-water volume ratio. There is then added to the dilute solution anhydrous ammonia at a predetermined rate with the acid-water ratio and the rate of addition of anhydrous ammonia causing the solution temperature to rise to at least about 90° C. The solution is maintained at less than its boiling temperature and the anhydrous ammonia addition thereto is continued until the pH is from 1.5 to about 3.5. The partially neutralized solution is then seeded with a predetermined amount of ammonium molybdate solid particles and the seeded and heated solution is then maintained at a temperature of at least about 90° C. but less than the solution boiling temperature for a period of from about one hour to about four hours. This shortened time is sufficient to precipitate substantially all molybdenum therefrom as ammonium molybdate. Thereafter, the resulting precipitated ammonium molybdate is separated from the residual solution.

In the commercial practice of U.S. Pat. No. 4,307,065 it is the usual practice to wash the precipitated ammonium molybdate one or more times with water after the precipitated crystals have been filtered from the spent acid solution. Washing is necessary because the remaining acid solution contains considerable amounts of dissolved salts such as ammonium nitrate and ammonium sulfate which will encrust on the ammonium molybdate crystals if the retained solution is allowed to dry before washing.

To save time in the washing, settling, and subsequent removal of the wash liquid from the ammonium molybdate crystals, the process of double-batching is employed wherein crystallized ammonium molybdate is allowed to settle and the neutralized acid solution is removed, but the precipitate is not discharged to the filter. Rather, additional dilute spent acid solution is added to the precipitate and the molybdenum is precipitated by the above method. In this way a larger quantity of precipitate is processed at each washing.

Often, however, the second precipitate is extremely fine and slow settling notwithstanding the first precipitate having had been coarse. These fine crystals require several hours for the second precipitate and washing slurries to adequately settle, offsetting the time savings associated with double-batching. The fine precipitate also causes the liquid to become and remain highly opaque even after essentially all crystals have adequately settled, rendering ineffective judgements on when and to what level to remove the liquid.

SUMMARY OF THE INVENTION

There is provided a method for rapidly recovering molybdenum in a form substantially free from other metals from a mixed sulfuric acid-nitric acid aqueous solution which has substantial quantities of molybdenum dissolved therein and which has been used to dissolve molybdenum mandrels from coiled tungsten filaments. In accordance with this method, the spent mixed acid solution is diluted with water to a predetermined acid-water volume ratio. There is then added to the dilute solution anhydrous ammonia at a predetermined rate with the acid-water ratio and the rate of addition of anhydrous ammonia causing the solution temperature to rise to at least about 90° C. The solution is maintained at less than its boiling temperature and the anhydrous ammonia addition thereto is continued until the pH is from 1.5 to about 3.5. The partially neutralized solution is then seeded with a predetermined amount of ammonium molybdate solid particles and the seeded and heated solution is then maintained at a temperature of at least about 90° C., but less than the solution boiling temperature until substantially all molybdenum is precipitated therefrom as ammonium molybdate.

The residual solution is removed from the precipitate and additional spent mixed acid solution replete with dissolved molybdenum is added to the precipitate; the mixed acid solution is diluted slightly with water, anhydrous ammonia is added to the solution, the temperature is controlled to between 90° C. and boiling, a precipitate is formed, and the foregoing repeated until the desired amount of precipitate is obtained. The precipitate is then washed with water and filtered.

The present invention would allow the processing of 260 gallons of spent acid in eight hours using a double batch. This is a substantial improvement over the prior art which can process only about 400 gallons of spent acid in a week.

DESCRIPTION OF THE PREFERRED EMBODIMENT

The result necessary to make practical multi-batch recovery of molybdenum dissolved in an acid solution is that the precipitate from each batch of the multi-batch process be coarse, that is, consist primarily of large particles. A coarse product has the advantages of precipitating quickly, settling from the remaining solution rapidly, washing more thoroughly due to its lower surface-to-volume ratio for a given mass of precipitate, and settling faster from the wash solution.

It has been discovered and the present invention employs methods that cause the precipitate to be coarse by employing means to dissolve substantially all the precipitated ammonium molybdate from the previous batches before adding anhydrous ammonia to the solution to cause precipitation in the current batch.

Dissolving substantially all the previously precipitated ammonium molybdate in the additional portion of said mixed acid solution is accomplished by one or more of the following: limiting the dilution of the additional portion of said mixed acid solution with water; stirring the acid/water/precipitate mixture before adding NH₃; and heating the acid/water/precipitate mixture, cooling the resulting solution, and seeding the cooled solution with ammonium molybdate crystals.

The effect of acid concentration on the particle size of the second precipitate is given below in Table I. In each case the acid/water/precipitate mixture was stirred for 15 minutes after addition of the diluted acid in order to promote dissolution of the ammonium molybdate. A visual judgement as to the degree of dissolving is indicated.

After addition of the ammonia the solution was stirred for two hours at 950° C.

TABLE I

Second Precipitation Ammonium Molybdate Crystal Size as a Function of Acid/Water Dilution Ratio

| Acid/Water Ratio | Stirring Time (Minutes) | Degree of Dissolution of First Precipitate | Ammonium Molybdate Crystal Size (Microns) |
|---|---|---|---|
| 80/230 | 15 | Minor | 11.2 |
| 80/200 | 15 | Minor | 11.2 |
| 80/160 | 15 | Major | 30.0 |
| 80/120 | 15 | Major | 40.0 |

To demonstrate the effect that stirring of the acid/water/precipitate mixture had upon the crystal size of the second precipitate, several second precipitations were performed with the same acid/water ratio, but with the initial stirring times varied—a visual evaluation of the degree of dissolution is given.

Again, after addition of the ammonia the solution was stirred for two hours at 95° C.

TABLE II

Effect of Stirring on the Size of the Second Ammonium Molybdate Precipitate

| Stirring Time (Minutes) | Acid/Water Ratio | Degree of Dissolution of First Precipitate | Ammonium Molybdate Crystal Size (Microns) |
|---|---|---|---|
| 15 | 80/230 | Minor | 11.2 |
| 0 | 80/230 | Minor | 9.3 |
| 15 | 80/120 | Major | 40.0 |
| 0 | 80/120 | Major | 38.0 |

Stirring the acid/water/precipitate mixture was found to have the effect of increasing the crystal size of the subsequent precipitate, albeit a minor effect secondary to variations in the acid/water dilution ratio.

To verify that the primary factor in determining the crystal size of the second precipitate is the extent to which the first precipitate had been dissolved and that other factors are important only to the extent that they affect dissolution, the following was performed. The first precipitate was mixed with acid and water at a ratio of 80/230; the resultant mixture was then heated to 50° C. and stirred until the precipitate was completely dissolved. The solution was then cooled, seeded with ammonium molybdate particles, and the anhydrous ammonia added.

Despite the large dilution of the acid of 80/230 (which previously resulted in crystals of 9.3 microns and 11.2 microns), the additional agitation and heat caused the first precipitate to dissolve completely in this case and resulted in 31.0 micron crystals for the second precipitate.

In the preferred practice of the invention to the first portion of the mixed acid solution containing the dissolved molybdenum is added one and a half to about twice that amount of water. Anhydrous ammonia is added to the diluted solution at a rate sufficient to cause the solution temperature to rise above 90° C. Thereafter, as the anhydrous ammonia is added, the solution temperature is kept below boiling by application of external cooling and the anhydrous ammonia addition is continued until the solution pH is between 1.5 and 3.5, with a pH between 2.5 and 3.0 preferred.

To the solution is then added seeding crystals in the amount of one gram solid ammonium molybdate per liter of heated solution to encourage precipitation of the ammonium molybdate out of solution. As the ammonium molybdate precipitates, the solution temperature is maintained between 90° C. and boiling by the application of external heating. When substantially all of the ammonium molybdate has been precipitated, the residual solution is removed, as by siphoning.

An additional portion of the mixed acid solution is added to the remaining precipitate and to that is added water in the amount of one and a half the volume of acid. The mixture is stirred during these additions to facilitate dissolution of the previously precipitated ammonium molybdate. Stirring may continue if needed during the initial stage of adding the anhydrous ammonia when the pH is still low (below about 1.5) but the temperature has risen above about 50° C. It is during this time that the majority of dissolving has been found to occur. Anhydrous ammonia is next added to the diluted solution at a rate sufficient to cause the solution temperature to rise above 90° C. Thereafter, as the anhydrous ammonia is added, the solution temperature is kept below boiling by application of external cooling and the anhydrous ammonia addition is continued until the solution pH is between 1.5 and 3.5, with a pH between 2.5 and 3.0 preferred. As the ammonium molybdate precipitates, the solution temperature is maintained between 90° C. and boiling by the application of external heating. When substantially all of the ammonium molybdate has been precipitated, the residual solution is removed, as by siphoning. The above procedure described in this paragraph of using an addition portion of mixed acid solution is repeated until the desired amount of precipitate is obtained or the mixed acid solution is exhausted. While the data given earlier is for the second batch of a multi-batch process, up to four batches have been performed without degradation of the 40 micron precipitate particle size.

As an alternative method to that given above for dissolving previously precipitated ammonium molybdate, the following procedure may be used particularly where the precipitating tank is not equipped with external cooling and an acid/water ratio of 80/230 must be used to prevent boiling. The mixture consisting of the precipitate, the additional portion of said mixed acid solution, and diluting water is heated to about 50° C. and stirred until substantially all the precipitate is dissolved. The solution is then allowed to cool to room temperature (in order to avoid boiling when ammonia is added) and is seeded with solid ammonium molybdate in the amount of about one gram per liter of solution.

Once the desired amount of ammonium molybdate is obtained or the mixed acid solution is exhausted, the precipitate is allowed to settle in the remaining liquid, and the liquid is decanted. The precipitate is washed by adding water and agitating the slurry, then decanting the wash water from the precipitate. The washing process is repeated until substantially all the residual solution is removed.

I claim:

1. A multiple batching method for rapidly and efficiently recovering molybdenum from a mixed sulfuric acid-nitric acid aqueous solution having substantial quantities of molybdenum dissolved therein, said mixed acid solution having been used to dissolve molybdenum mandrels from coiled tungsten filaments, which method comprises:
   a. diluting a first portion of said mixed acid solution with water to a first predetermined acid-water volume ratio,
   b. adding anhydrous ammonia to said diluted first portion of said solution at a predetermined rate sufficient to cause the solution temperature to rise to at least about 90° C., maintaining the solution temperature at less than its boiling temperature, and continuing the controlled anhydrous ammonia addition to said solution while maintaining the solution temperature of at least about 90° C. but less than the solution boiling temperature until the solution pH is from about 1.5 to about 3.5,
   c. seeding the partially neutralized solution with a small predetermined amount of ammonium molybdate solid particles,
   d. maintaining the seeded solution at a temperature of at least about 90° C. but less than the solution boiling temperature until substantially all molybdenum is precipitated therefrom as ammonium molybdate, and separating the resulting precipitated ammonium molybdate from residual solution,
   e. adding an additional portion of said mixed acid solution to said separated ammonium molybdate, diluting said added additional portion of said mixed acid solution with water to a second predetermined acid-water volume ratio, redissolving the precipitated ammonium molybdate while adding anhydrous ammonia to said solution at a predetermined rate sufficient to cause the solution temperature to rise to at least about 90° C. but less than its boiling temperature, and continuing the controlled anhydrous ammonia addition to said solution while maintaining the solution temperature of at least about 90° C. but less than the solution boiling temperature until the solution pH is from about 1.5 to about 3.5, maintaining the solution at a temperature of at least about 90° C. but less than the solution boiling temperature until substantially all molybdenum is precipitated therefrom as ammonium molybdate, separating the resulting precipitated ammonium molybdate from residual solution, and repeating the foregoing steps utilizing additional batch amounts of spent acid solution to accumulate additional batch amounts of precipitated ammonium molybdate,
   f. washing the precipitate by adding water to the precipitated ammonium molybdate, agitating the slurry, allowing substantially all the precipitate to settle, removing the wash water from the settled precipitate, and repeating the foregoing washing as required to remove substantially all soluble impurities from said precipitate.

2. The method as specified in claim 1 wherein said first portion of mixed acid solution is diluted with water in the amount of from about 1.5 to about twice the volume of said first portion of mixed acid solution, said additional portion of mixed acid solution is diluted with water in the amount of about 1.5 the volume of said additional portion of mixed acid solution external cooling is applied to said solution during anhydrous ammonia addition thereto to prevent boiling of the resultant mixture, and anhydrous ammonia addition is continued until the solution pH is from about 2.5 to about 3.0.

3. The method as specified in claim 1 wherein said seeding is accomplished by adding to said heated solution ammonium molybdate solid particles in amount of about one gram per liter of said heated solution, and external heating is applied to the seeded solution during precipitation of said ammonium molybdate.

4. The method as specified in claim 1 wherein stirring is employed after the additional portion of said mixed acid solution is added to the previously precipitated ammonium molybdate and stirring continues through the process of diluting with water and the initial stage of adding anhydrous ammonia, that is while the pH is below about 1.5, but the temperature has risen above about 50° C., until substantially all the previously precipitated ammonium molybdate is dissolved.

5. The method as specified in claim 1 wherein the mixture consisting of the previously precipitated ammonium molybdate, the additional portion of said mixed acid solution, and the diluting water is heated to about 50° C. and stirred to dissolve substantially all the precipitate, the solution then cooled to about its original temperature and seeded with ammonium molybdate crystals before adding the anhydrous ammonia.

* * * * *